s008947426B2
US008947426B2

(12) United States Patent
Hamada

(10) Patent No.: US 8,947,426 B2
(45) Date of Patent: Feb. 3, 2015

(54) DISPLAY CONTROL APPARATUS AND DISPLAY CONTROL METHOD

(75) Inventor: Naru Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/439,710

(22) Filed: Apr. 4, 2012

(65) Prior Publication Data
US 2012/0256913 A1 Oct. 11, 2012

(30) Foreign Application Priority Data
Apr. 8, 2011 (JP) ................. 2011-086515

(51) Int. Cl.
*G06T 15/00* (2011.01)
*G09G 3/00* (2006.01)
*G06T 19/20* (2011.01)

(52) U.S. Cl.
CPC ......... *G06T 19/20* (2013.01); *G06T 2219/2004* (2013.01)
USPC ........................................... 345/419; 345/32

(58) Field of Classification Search
CPC ......... G06T 19/00; G06T 17/20; G06T 17/00; G06T 15/10; G06T 15/00; G09G 5/006; G09G 5/008; G09G 5/18; G09G 3/3611; G09G 5/12; G09G 2300/023; G09G 2310/0213; G09G 2340/10; G09G 3/001; G09G 3/003

USPC .......... 345/213, 32; 382/128; 707/7; 715/272
See application file for complete search history.

(56) References Cited

U.S. PATENT DOCUMENTS

2009/0150772 A1* 6/2009 Noda et al. ..................... 715/277
2010/0135555 A1* 6/2010 Kobayashi et al. ............ 382/128
2011/0001746 A1* 1/2011 Kim et al. ...................... 345/213

FOREIGN PATENT DOCUMENTS

JP 2005-071332 A 3/2005

* cited by examiner

Primary Examiner — Kee M Tung
Assistant Examiner — Nicole Gillespie
(74) *Attorney, Agent, or Firm* — Canon USA Inc. IP Division

(57) ABSTRACT

A display control apparatus of the present invention displays a plurality of images on a display device capable of performing three-dimensional representation by laying out the images at a predetermined interval in a depth direction of three-dimensional representation, and includes a determination unit configured to determine a display interval between the plurality of images belonging to an identical group depending on the number of images contained in the group, a layout unit configured to lay out the plurality of images in a depth direction based on the display interval of each group determined by the determination unit, and a display control unit configured to display the images laid out by the layout unit on the display device.

10 Claims, 8 Drawing Sheets

FIG.5B

| Address | Col1 | Col2 |
|---|---|---|
| 0xbfa0_0000 | 101 | 2 |
| 0xbfa0_0004 | 0xbfa0_0100 ||
| 0xbfa0_0008 | 102 | 3 |
| 0xbfa0_000c | 0xbfa0_0104 ||
| 0xbfa0_0010 | 103 | 5 |
| 0xbfa0_0014 | 0xbfa0_010a ||
| 0xbfa0_0018 | 104 | 6 |
| 0xbfa0_001c | 0xbfa0_0114 ||

| Address | Col1 | Col2 |
|---|---|---|
| 0xbfa0_0100 | 0101 | 0102 |
| 0xbfa0_0104 | 0201 | 0202 |
| 0xbfa0_0108 | 0203 | 0301 |
| 0xbfa0_010c | 0302 | 0303 |
| 0xbfa0_0110 | 0304 | 0305 |
| 0xbfa0_0114 | 0401 | 0402 |
| 0xbfa0_0118 | 0403 | 0404 |
| 0xbfa0_011c | 0405 | 0406 |

| Address | Col1 | Col2 |
|---|---|---|
| 0xbfa0_0200 | 0 | $\alpha$ |
| 0xbfa0_0204 | 0 | $\alpha/2$ |
| 0xbfa0_0208 | $\alpha$ | 0 |
| 0xbfa0_020c | $\alpha/4$ | $\alpha/2$ |
| 0xbfa0_0210 | $(3\alpha)/4$ | $\alpha$ |
| 0xbfa0_0214 | 0 | 0 |
| 0xbfa0_0218 | 0 | 0 |
| 0xbfa0_021c | 0 | $\alpha$ |

DISPLAY CONTROL APPARATUS AND DISPLAY CONTROL METHOD

BACKGROUND OF THE INVENTION

1. Field of the Invention

The present invention relates to a display control apparatus configured to display three-dimensional images.

2. Description of the Related Art

Three-dimensional imaging apparatuses have been proposed recently in which two lenses are arranged in parallel to each other and video signals input through the respective lenses are reproduced for both right and left eyes of a user to allow the user to recognize the video signals three-dimensionally by using parallax.

When three-dimensional images are reproduced, to recognize three-dimensional images three-dimensionally, a method of watching the reproduced images with a pair of polarization glasses or a pair of glasses each provided with an electronic shutter, and a method of using lenticular lenses to recognize the three-dimensional images three-dimensionally without any glasses, have been proposed.

In the above-described three-dimensional image reproduction technology, a technology in which an image is laid out in a depth direction has been known. Japanese Patent Application Laid-Open No. 2005-071332 discusses a technique when laying out each image of grouped objects on a display unit, the images included in each group are displayed being spaced at an equal distance in the depth direction when the images are displayed by each group, as illustrated in FIG. 3 of the present application.

If the distance between the images is equal in each group, a display range in the depth direction from an image located at the front surface (foreground) to an image located at the back surface is changed depending on the number of images included in the group. Consequently, a group including a large number of images has a large depth while a group including a small number of images has a small depth.

Thus, according to the three-dimensional representation with images laid out in the depth direction by each group, when a user watches the images of each group, the focus of the user's eyes and the amount of parallax change largely each time when the user moves from one group to another, thereby enhancing the feeling of fatigue to the user compared to 2-dimensional representation.

SUMMARY OF THE INVENTION

According to an aspect of the present invention, a display control apparatus displays a plurality of images classified into a plurality of groups on a display device capable of performing three-dimensional representation by laying out the plurality of images at a predetermined interval in a depth direction of the three-dimensional representation, and includes a determination unit configured to determine, for each group, a display interval between the plurality of images belonging to an identical group depending on a number of images included in the group, a layout unit configured to lay out the plurality of images in a depth direction based on the display interval of each group determined by the determination unit, and a display control unit configured to display the images laid out by the layout unit on the display device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B illustrate display targets of the digital camera and a memory map of display target data according to the present invention.

DESCRIPTION OF THE EMBODIMENTS

Various exemplary embodiments, features, and aspects of the invention will be described in detail below with reference to the drawings.

Hereinafter, a first exemplary embodiment of the present invention will be described in detail. An imaging apparatus employing a display control method of the present invention will be described with reference to the accompanying drawings.

Figure 1:
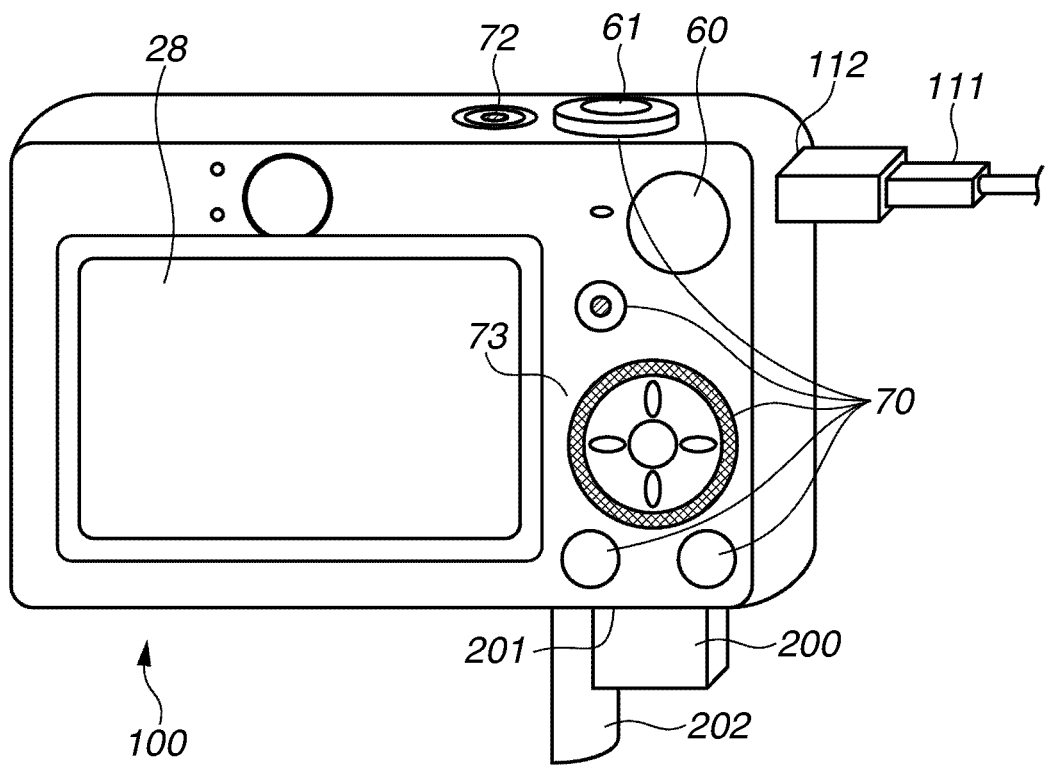
FIG. 1 is a diagram illustrating an appearance of a digital camera according to an exemplary embodiment of the present invention.

FIG. 1 illustrates an appearance of a digital camera 100 according to the first exemplary embodiment of the present invention. A display unit 28 displays images and a variety of other information three-dimensionally. A shutter button 61 is an operating unit configured to give a shooting instruction. A mode dial 60 is an operation unit configured to switch operation modes. A connector 112 connects a connection cable to the digital camera 100. An operation unit 70 includes a variety of switches and buttons configured to accept various operations by the user. The display unit 28 includes a touch panel (not illustrated), functioning as a component of the operation unit 70.

A controller wheel 73 is a rotatable operation member included in the operation unit 70. A power switch 72 turns on/off the power. As a recording medium 200, a memory card, a hard disk and the like are available. A recording medium slot 201 stores the recording medium 200. The recording medium 200 stored in the recording medium slot 201 can communicate with the digital camera 200. The recording medium slot 201 has a lid 202.

Figure 2:
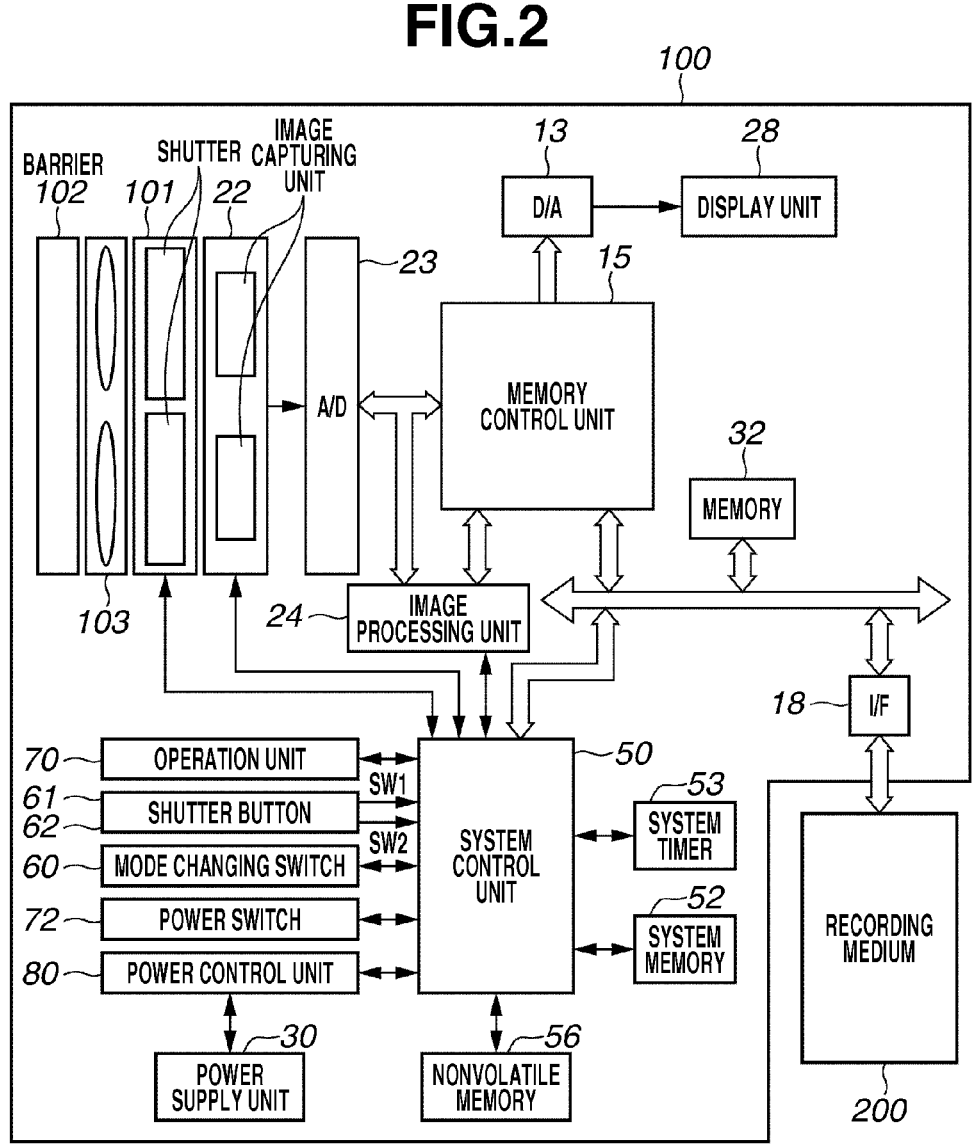
FIG. 2 is a structural diagram of the digital camera according to the present invention.
Figure 3:
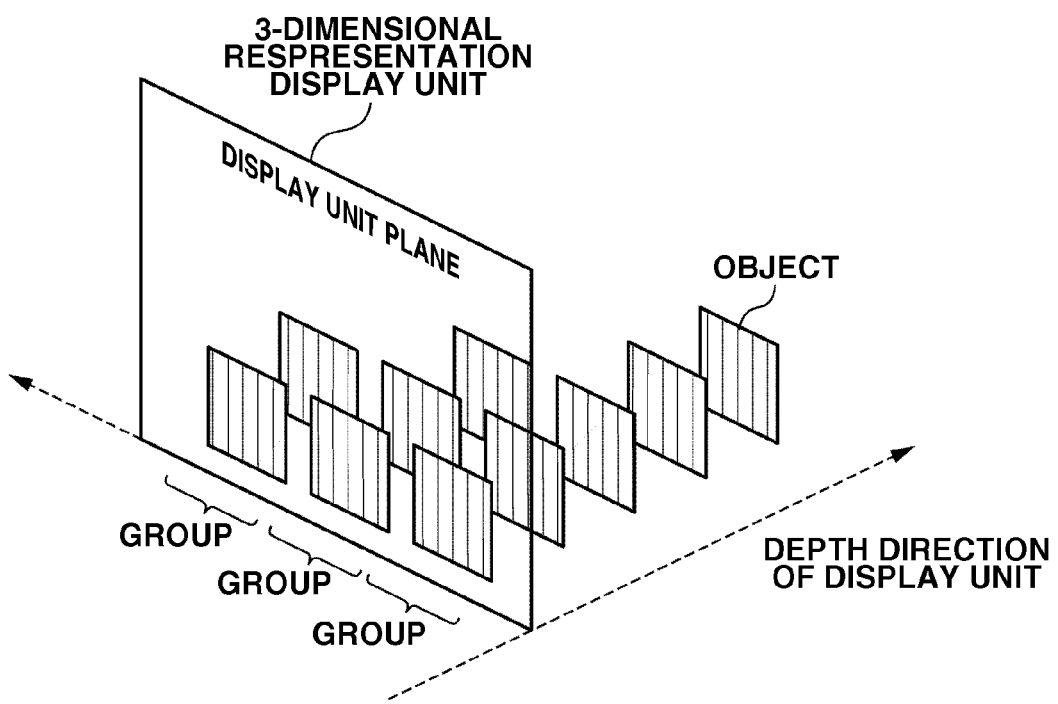
FIG. 3 is a diagram illustrating an example of representation according to the conventional technology.

FIG. 2 is a block diagram illustrating an example of the configuration of the digital camera 100 according to the exemplary embodiment.

Referring to FIG. 2, the digital camera 100 includes shooting a lens 103 containing a focus lens, a shutter 101 including a diaphragm function, and an image capturing unit 22 constituted of CCD (charged-coupled device), CMOS (complementary metal-oxide semiconductor) or the like and configured to convert optical images to electric signals. To generate signals for a three-dimensional image to the right and left eyes, two pieces of the shooting lens 103, the shutter 101 and the image capturing unit 22 are provided. An analog to digital (A/D) converter 23 converts an analog signal to a digital signal. The A/D converter 23 converts an analog signal output from the image capturing unit 23 to a digital signal. A barrier 102 covers the image capturing unit containing the shooting lens 103 of the digital camera 100 to protect an image capturing system including the shooting lens 103, the shutter 101 and the image capturing unit 22 from contamination and damage.

An image processing unit 24 executes predetermined resize processing such as pixel interpolation and reduction, and color conversion processing on data transmitted from the A/D converter 23 or data transmitted from a memory control unit 15. The image forming unit 24 executes predetermined calculation processing using captured image data, and based on a calculation result obtained thereby, a system control unit 50 executes exposure control and focusing control. As a result, through-the-lens (TTL) type auto-focus (AF) processing, automatic exposure (AE) processing and electronic flash preliminary emission (EF) processing are executed. The image processing unit 24 executes predetermined calculation processing using the captured image data and additionally, executes TTL type auto-white balance (AWB) processing based on a calculation result obtained thereby.

The image processing unit 24 generates three-dimensional image data corresponding to both the right and left eyes to allow the user to obtain a stereoscopic view.

Data output from the A/D converter 23 is written directly into a memory 32 via the image processing unit 24 and the memory control unit 15 or via the memory control unit 15. The memory 32 stores image data obtained by the image capturing unit 22 and converted to digital data by the image capturing unit 22 and image data to be displayed on the display unit 28. The memory 32 has a sufficient storage capacity capable of storing a predetermined number of still images or moving images and sound of a predetermined time period.

The memory 32 serves as a memory (video memory) for use in displaying images. A digital to analog (D/A) converter 13 converts image data stored in the memory 32 and supplies the converted image data to the display unit 28. Consequently, the image data written in the memory 32 is displayed by the display unit 28 via the D/A converter 13. On a display device such as a liquid crystal device (LCD), the display unit 28 performs display corresponding to analog signals supplied from the D/A converter 13. Digital signals, which are A/D converted by the A/D converter 23 once and are stored in the memory 32, are converted to analog signals by the D/A converter 13, and transferred to the display unit 28 successively to display images, so that the display unit 28 functions as an electronic view finder (which displays a through image).

A nonvolatile memory 56 is an electrically-erasable and recordable memory, such as an electrically erasable programmable read-only memory (EEPROM). The nonvolatile memory 56 stores a constant, a program and the like for actuating a system control unit 50. The program mentioned here includes a program for executing a variety of flow charts described below in the present exemplary embodiment.

The system control unit 50 controls the digital camera 100 entirely. The system control unit 50 reads a program recorded in the nonvolatile memory 56 and executes the program to achieve respective processings in the present exemplary embodiment described below. As a system memory 52, a random access memory (RAM) is used. A constant for activating the system control unit 50, variables, programs read out from the nonvolatile memory 56 and the like are developed and memorized in the system memory 52. The system control unit 50 controls the memory 32, the D/A converter 13 and the display unit 28 to perform display control.

A system timer 53 is a time counting unit configured to count a time used for a variety of controls and a time of an incorporated clock.

A mode changing switch 60, a first shutter switch 61, a second shutter switch 62, and an operation unit 70 serve as operation units configured to input a variety of operation commands into the system control unit 50.

The mode changing switch 60 changes an operation mode of the system control unit 50 to any one of a still image recording mode, a moving image recording mode, and a reproduction mode. The first shutter switch 61 is turned on when the shutter button 61 provided on the digital camera 100 is in a halfway state of its operation, e.g., half-pressed state (command for preparation for shooting) to generate a first shutter switch signal SW1. The first shutter switch signal SW1 starts motions of auto-focus (AF) processing, automatic exposure (AE) processing, auto-white balance (AWB) processing, and electronic flash preliminary emission (EF) processing.

The second shutter switch 62 is turned on when the shutter button 61 is pressed completely, e.g., in a so-called full-pressed state (shooting command) to generate a second shutter switch signal SW2. The system control unit 50 starts a series of shooting processing operations from reading of a signal from the image capturing unit 22 to writing of image data into a recording medium 200 according to the second shutter switch signal SW2.

The respective operation members of the operation unit 70 are appropriately assigned functions in each screen by operating a variety of function icons displayed on the display unit 28 selectively, so that the respective operation members of the operation unit 70 serve as each function button. As the function button, for example, a finish button, a return button, an image feed button, a jump button, a retrieval button, an attribute change button, an image contour enhancement button, a focus position enlargement button and the like are available. For example, when a menu button is pressed, a menu screen which allows a variety of settings to be made is displayed on the display unit 28. Using the menu screen displayed on the display unit 28, four-direction buttons, a set button, a touch panel or the like, a user can execute a variety of settings intuitively.

The controller wheel 73 is a rotatable operation member included in the operation unit 70 and used to instruct a choice item together with the direction buttons. When the controller wheel 73 is operated, the controller wheel 73 generates an electric pulse signal corresponding to the amount of operation, and based on this pulse signal, the system control unit 50 controls respective units of the digital camera 100. This pulse signal allows to determine an angle by which the controller wheel 73 is rotated and a number of its rotations.

Any type of the controller wheel 73 may be used as long as it is capable of detecting a user's rotating operation. For example, it is permissible to use a dial operation member whose controller wheel 73 itself generates a pulse signal while rotating corresponding to the user's rotating operation. Further, a touch-sensor type operation member maybe used, which senses a rotating motion of a user's finger on the controller wheel 73 without any rotation of the controller wheel 73 (i.e., touch wheel).

A power control unit 80 includes a battery detection circuit, a DC-DC converter, and a switch circuit configured to change a powered block to detect whether a battery is mounted, a type of the battery and a remaining battery capacity. The power control unit 80 controls the DC-DC converter based on a detection result and an instruction of the system control unit 50, and supplies a necessary voltage to respective units as well as the recording medium 200 in a necessary period.

A power supply 30 includes a primary battery such as an alkaline battery, a lithium battery or a secondary battery such as NiCd (nickel cadmium) battery, NiMH (nickel metal hydride) battery, Li (lithium) battery, and an AC (alternating current) adapter. An interface (I/F) 18 interfaces with the recording medium 200 such as a memory card and a hard disk. The recording medium 200 is constructed of a semiconductor, a magnetic disk or the like, an example of which is a memory card.

Figure 4A:
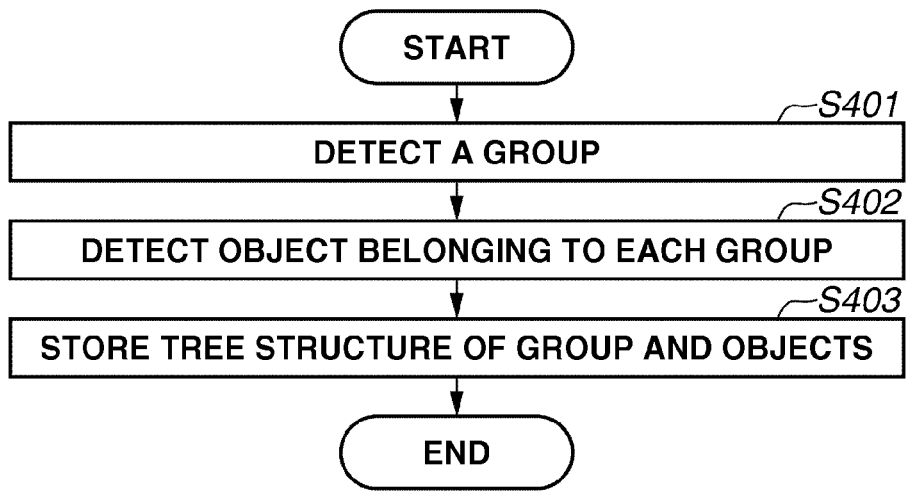
FIGS. 4A, 4B and 4C are flow charts illustrating a display processing of the digital camera according to the present invention.

Next, a display method of objects to be represented three-dimensionally in the digital camera 100 according to the present invention will be described with reference to the flow charts of FIGS. 4A, 4B, and 4C.

In the present exemplary embodiment, a case where image data are handled as a group with each directory standardized according to Design Rule for Camera File system (DCF) when displaying the image data on a digital camera will be described below. At this time, an image indicating an exchangeable image file format (Exif) based image file under the control of the DCF directory is handled as an object for the three-dimensional representation.

Figure 5A:
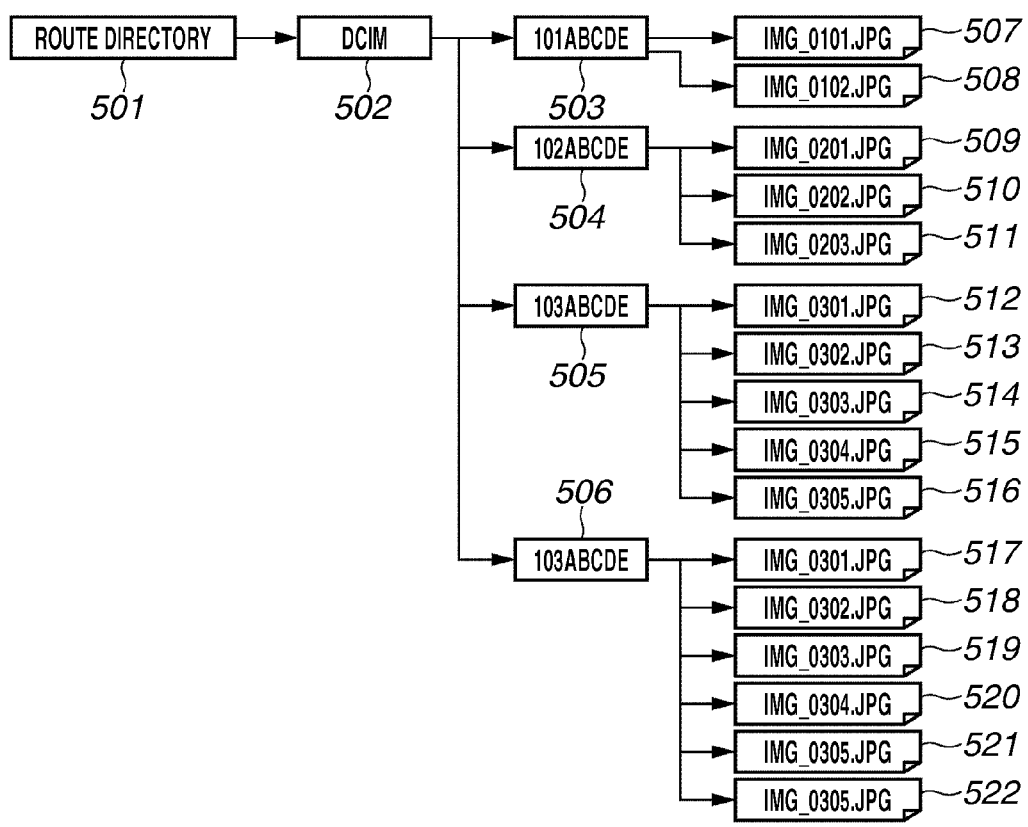

Consider a case where the recording medium 200 has a plurality of Exif image files stored in the DCF directory as illustrated in FIG. 5A.

Referring to FIG. 5A, the route directory 501 of the recording medium 200 stores a DCF route directory 502 designated "DCIM". The DCF route directory 502 stores DCF directories designated 503 to 506, and each DCF directory stores Exif image files 507 to 522.

A DCF directory 503 designated "101ABCDE" stores two images, i.e., an Exif image file 507 designated "IMG_0101.JPG" and an Exif image file 508 designated "IMG_0102.JPG".

A DCF directory 504 designated "102ABCDE" stores three images, i.e., an Exif image file 509 designated "IMG_0201.JPG" to an Exif image file 511 designated "IMG_0203.JPG".

A DCF directory 505 designated "103ABCDE" stores five images, i.e., an Exif image file 512 designated "IMG_0301.JPG" to an Exif image file 516 designated "IMG_0305.JPG".

A DCF directory 506 designated "104ABCDE" stores six images, i.e., an Exif image file 517 designated "IMG_0401.JPG" to an Exif image file 522 designated "IMG_0406.JPG".

First, a processing which, with the recording medium 200 inserted into a recording medium slot 201 in the digital camera 100, is executed when terminating an analysis processing of a file system represented by File Allocation Table (FAT), will be described below.

In step S401, the system control unit 50 detects a group of objects in the recording medium 200. In this case, the system control unit 50 retrieves a DCF directory from the recording medium 200, stores a DCF directory number of the DCF directory into the memory 32 and proceeds to step S402.

In step S402, the system control unit 50 detects an object belonging to each group. Here, the system control unit 50 refers to a DCF directory stored in the memory 32, retrieves an Exif image file stored in the DCF directory and proceeds to step S403.

Next, instep S403, the system control unit 50 relates a DCF file number of the detected Exif image file to a DCF directory number of each DCF directory stored in the memory 32, and stores the directory in the memory 32 in a storage format described below.

The DCF directory retrieved in step S401 is stored as illustrated in a memory map of FIG. 5B. More specifically, a DCF directory number "101" of the directory 503 is stored using an area of 2 bytes starting from an address 0xbfa0_0000 on the memory 32. Then, a DCF directory number "102" of the directory 504 is stored using an area of 2 bytes starting from an address 0xbfa0_0008 on the memory 32, and a DCF directory number "103" of the directory 505 is stored using an area of 2 bytes starting from address 0xbfa0_0010 on the memory 32. Then, a DCF directory number "104" of the directory 506 is stored in an area of 2 bytes starting from an address 0xbfa0_0018 on the memory 32.

The Exif image file retrieved in step S402 is managed by the memory 32 as illustrated in FIG. 5B. More specifically, DCF file numbers of image files 507 and 508 stored in the directory 503 are stored successively using an area of 2 bytes for each file number starting from address 0xba0_0100. An address 0xbfa0_0100 of the first image file 507 in the directory 503 is stored in an address 0xbfa0_0004. A number of pieces (i.e., "2") of the image files 507 and 508 stored in the directory 503 is stored in an address 0xbfa0_0002.

DCF file numbers of the image files 509 to 511 stored in the directory 504 are stored successively using an area of 2 bytes for each file number starting from address 0xbfa0_0104 which is next to the storage area of the DCF file numbers of the image files 507 and 508. Then, an address 0xbfa0_0104 of the first image file 509 in the directory 504 is stored in an address 0xbfa0_000c. A number of pieces (i.e., "3") of the Exif image files 509 to 511 stored in the DCF directory 504 is stored in an address 0xbfa0_000a.

DCF file numbers of the image files 512 to 516 stored in the directory 505 are stored successively using an area of 2 bytes for each file number starting from address 0xbfa0_010a which is next to the storage area of the DCF file numbers of the image files 509 to 511. An address 0xbfa0_010a of the first image file 512 in the directory is stored in an address 0xbfa0_0014. A number of pieces (i.e., "5") of the image files 512 to 516 stored in the directory 505 is stored in an address 0xbfa0_0012.

DCF file numbers of the image files 517 to 522 stored in the directory 506 are stored successively using an area of 2 bytes for each file number starting from an address 0xbfa0_0114 which is next to the storage area of the DCF file numbers of the image files 512 to 516. Address 0xbfa0_0114 of the first image file 517 in the directory is stored in an address 0xbfa0_001c. A number of pieces (i.e., "6") of the image files 517 to 522 stored in the DCF directory 506 is stored in an address 0xbfa0_001a.

A processing for thumbnail image reproduction on an Exif image reproduction screen, executed after the above-described steps S401 to S403, will be described below.

In step S404, the system control unit 50 determines a group to be displayed. In case of the digital camera 100, the system control unit 50 determines which directory should be displayed with reference to information of FIG. 5B. The determination is performed by user's operating the operation unit to set a directory to be displayed. At the first step for image display, the system control unit 50 determines to display Exif image files stored in three directories, i.e., directories 503 to 505, in ascending order in the directory number.

Next, in step S405, the system control unit 50 determines a display position of an image at the head of the group to be displayed. In case of the digital camera 100, the system control unit 50 determines where in the plane of the display unit 28 images at the head of the three DCF directories determined in step S404 should be displayed.

Figure 6:
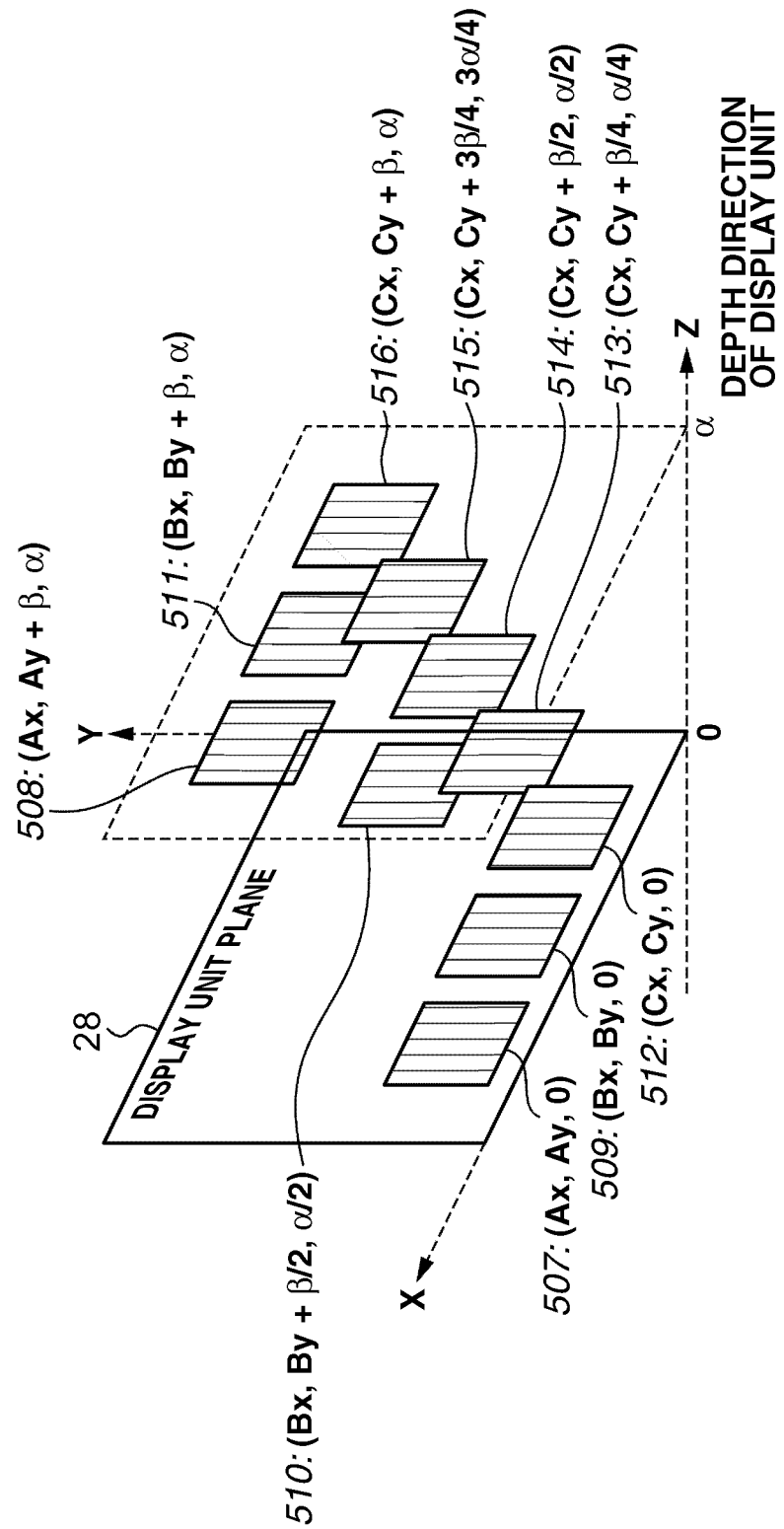
FIG. 6 is a diagram illustrating an example of representation of the digital camera according to the present invention.

For example, as illustrated in FIG. 6, central coordinates of the images at the head of the DCF directories 503 to 505 are laid out at coordinates (Ax, Ay), (Bx, By), and (Cx, Cz) in the plane respectively.

In step S406, the system control unit 50 sets a reference destination to a first DCF directory among the directories determined to be displayed (in the above description, DCF directory 503) and proceeds to step S407.

Figure 4B:
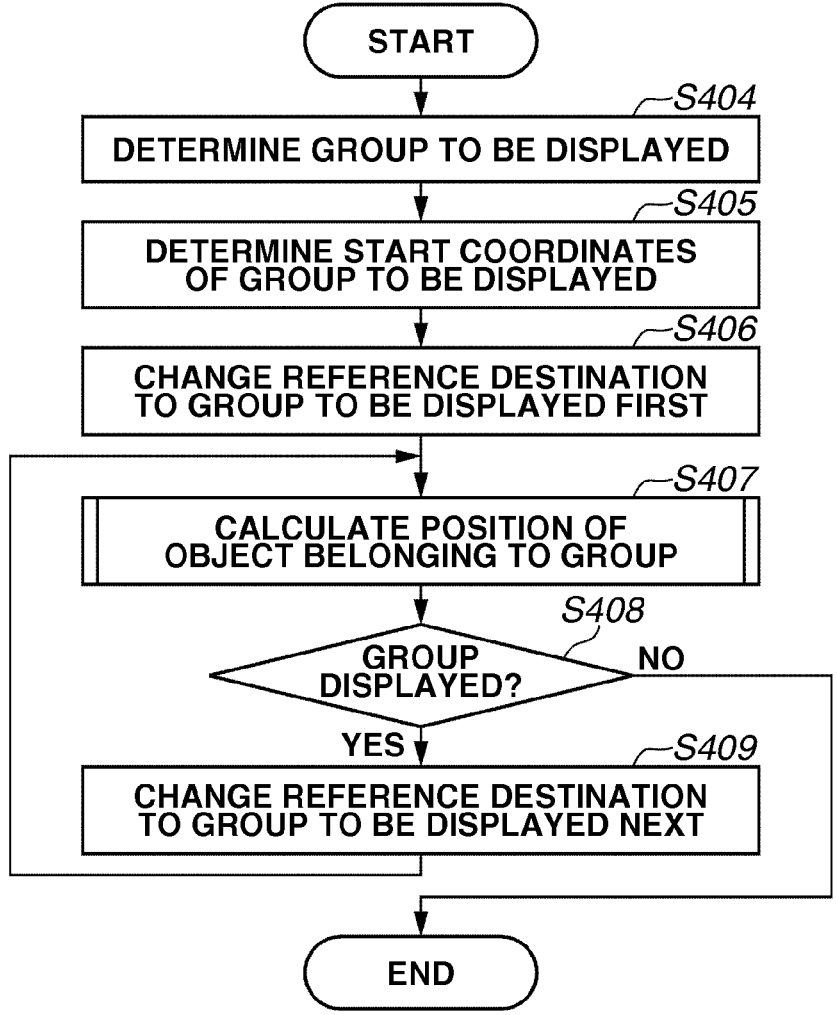
Figure 4C:
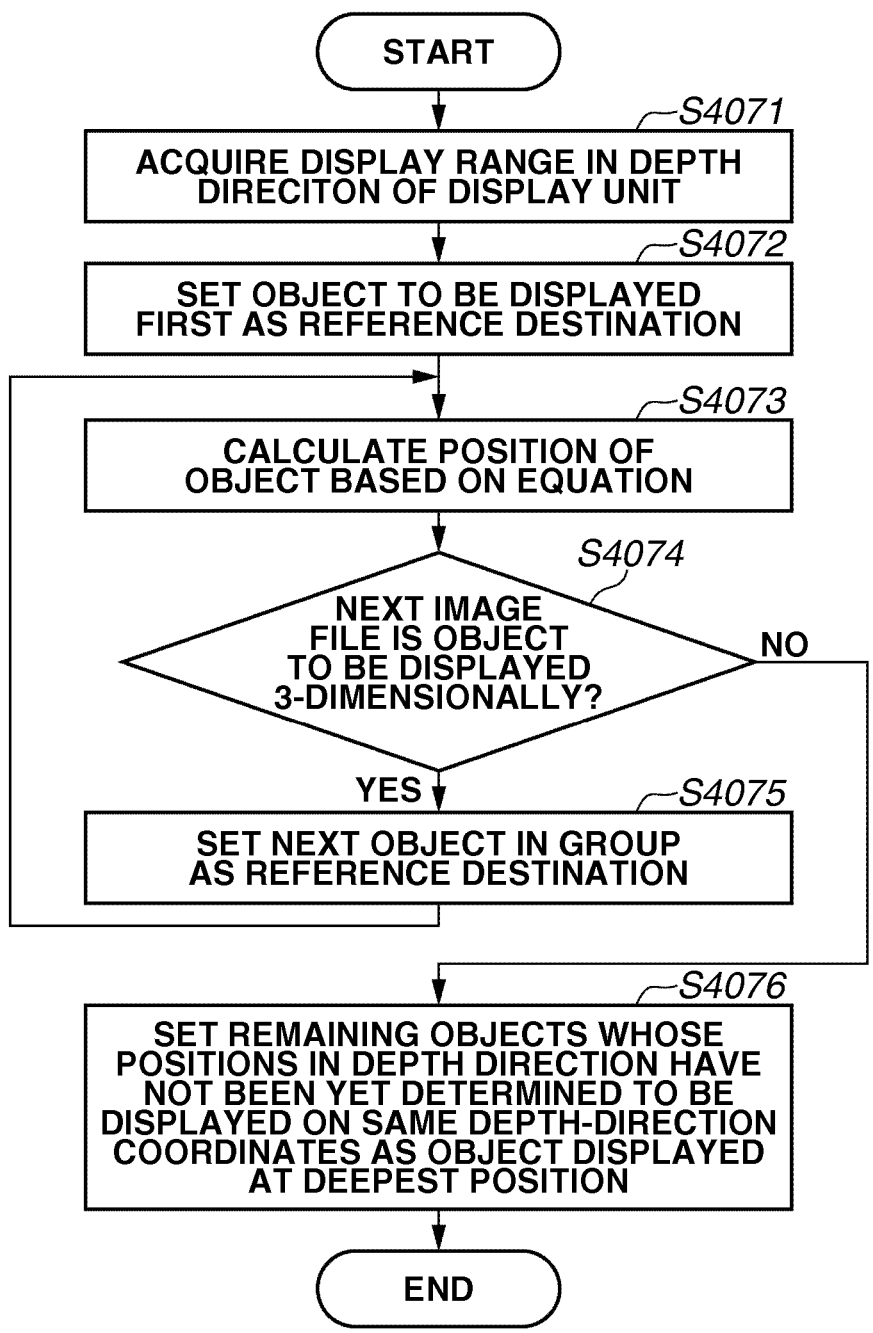

In step S407, the system control unit 50 executes display position calculation processing described in the flow chart of FIG. 4C with respect to a referenced DCF directory.

In step S4071, the system control unit 50 acquires a display range in the depth direction for laying out and displaying an image on the display unit.

The display range in the depth direction may be of a fixed value acquired from physical or electric characteristic of the display unit 28 or a display range may have each display range value which is determined in a display range table of the display unit 28, to which the system control unit 50 refers.

Here, as an example, assume that the display range is set in a fixed value and that the display is performed in a range from the plane surface of the display unit up to $\alpha$ in the depth direction. Then, the range from 0 to $\alpha$ in the depth direction is set as the display range. The amount of parallax between an image for the right eye and an image for the left eye changes depending on this value $\alpha$.

The coordinates of front images of the DCF directories 503 to 505 are determined to be (Ax, Ay, 0), (Bx, By, 0), and (Cx, Cz, 0), respectively.

Next, in step S4072, in the referenced DCF directory, the system control unit 50 sets an image file to be displayed on the front face as a reference destination object.

For example, if the DCF directory 503 is a reference destination DCF directory, an image file 507 is referred to from data 0101 stored in an address 0xbfa0_0100 instructed by the address 0xbfa0_0004 on the memory 32. When the DCF directory 505 is a reference destination DCF directory, an Exif image file 507 is referred to from data 0201 stored in an address 0xbfa0_0104 instructed by the address 0xbfa0_000c on the memory 32. When the DCF directory 506 is a reference destination DCF directory, an Exif image file 507 is referred to from data 0301 stored in an address 0xbfa0_010a instructed by the address 0xbfa0_0014 on the memory 32. From the image file set as a reference destination, its image data or thumbnail data is read out as a display object. When a user selects an arbitrary image as the front face image by operating the operation unit 70, the selected image file may be set as a reference destination, so that the selected image file is determined as the display object.

In step S4073, the system control unit 50 acquires a number of the Exif image files stored under the referenced DCF directory from the memory 32, acquires a position (coordinates) in the depth direction of three-dimensionally displayed objects and then proceeds to step S4074.

As the number of pieces of the Exif image files stored under the referenced DCF directory, "2" is acquired in case of the DCF directory 503, "3" in case of the DCF directory 504, and "5" in case of the DCF directory 505.

By calculating a position (coordinates) of an Exif image file in the depth direction according to an equation $\alpha \times (i-1)/n$, which is an example of the equations for obtaining the position in the depth direction, coordinates of Exif image files in the depth direction are stored using an area of 2 bytes for each coordinate starting from an address 0xbfa0_0200 on the memory 32.

This equation enables to determine a display interval between a plurality of images in each group and to determine their coordinates in the depth direction.

The "i" in the above equation indicates to which position from the head of a group the referenced Exif image file belongs.

The value "n" in the equation indicates any smaller value of a number of image files in each group and an upper limit value of image files which can be laid out within the depth $\alpha$ used in step S407, which will be described below, minus 1.

According to the present exemplary embodiment, five pieces of the image files including an image file displayed on the front face are displayed three-dimensionally, while the sixth image and following images are not displayed three-dimensionally. In this case, the upper limit value of the images laid out within the depth $\alpha$ is 5.

In step S4074, the system control unit 50 determines whether an image file next to the referenced image file is an object to be displayed three-dimensionally. In the present exemplary embodiment, the system control unit 50 determines whether the next image file is within five pieces of the image files from the head of each group.

Although the number of images laid out within the depth $\alpha$ is of a fixed value, it may be variable depending on a display mode or a size of a displayed image or determined by a user's setting.

If it is determined that the next image file is an object to be displayed three-dimensionally as a result of the above processing (YES in step S4074), the processing proceeds to step S4075, and otherwise (NO in step S4074), the processing proceeds to step S6076.

In step S4075, of the Exif image files laid out under the referenced DCF directory, the system control unit 50 sets an Exif image file having the next lowest DCF file number as a referenced destination display object, and the processing returns to step S4073.

In step S4076, the system control unit 50 sets remaining objects whose positions in the depth direction have not been yet determined to be displayed on the same depth-direction coordinates as an object displayed at the deepest position. According to the above description, the sixth image and subsequent images are set at the same depth-direction position as the fifth image.

According to the above processing, when the system control unit 50 displays the DCF directory 506, the system control unit 50 sets the sixth Exif image file 522 at the same depth-direction position as the Exif image file 521 located at the fifth position from the front face. At this time, the display size of the Exif image file 0522 may be made smaller by a specific rate than the display size of reproduction of the fifth image file. Alternatively, the present exemplary embodiment may be modified such that the sixth image and subsequent images are not displayed.

In step S408 after the above-described processing of step S407 is executed, the system control unit 50 determines whether a DCF directory having the next lowest DCF directory number to the referenced DCF directory is a target directory determined to be displayed in S404. If as a result of the determination, the system control unit 50 determines to display the DCF directory having the next lowest DCF directory number to the referenced DCF directory (YES instep S408), it proceeds to step S409, and otherwise (NO in step S408), the system control unit 50 terminates the processing.

In step S409, the DCF directory having the next lowest DCF directory number to the currently referenced DCF directory is set as a newly referenced DCF directory and the processing returns to step S407.

As a result of the processings of FIGS. 4B and 4C, as illustrated in the memory map of FIG. 5B, the Exif image file 507 stored under the DCF directory 503 has the depth-direction position "0" and the Exif image file 508 has the depth-direction α. A depth-direction position of the Exif image file 509 stored under the DCF directory 504 is "0", that of the Exif image file 510 is α/2, and that of the Exif image file 511 is α. A depth-direction position of the Exif image file 512 stored under the DCF directory 505 is "0", that of the Exif image file 513 is α/4, that of the Exif image file 514 is α/2, that of the Exif image file 515 is (3α)/4, and that of the Exif image file 516 is α.

Based on the depth-direction display positions determined by the processings of steps S401 to S408, the system control unit 50 displays the Exif image files 507 to 516 on the display unit 28 as illustrated in FIG. 6.

The Exif image file 507 is laid out at a position of coordinates (Ax, Ay, 0) in the plane of the DCF directory 503 determined in step S4072.

Further, a depth-direction position of the Exif image file 508 is α, and then, to improve visibility of the Exif image located behind, that depth-direction position is shifted in the y-axis direction by β, which is a value obtained by multiplying the depth-direction position by β/α. As a result, the Exif image file 508 is displayed at coordinates (Ax, Ay+β, α).

The Exif image file 509 is laid out at a position of coordinates (Bx, By, 0) in the plane of the DCF directory 504 determined in step S4072.

Further, the depth-direction position of the Exif image file 510 is α/2, and to improve visibility of the Exif image file located behind, that depth-direction position is shifted in the y-direction by β/2, which is a value obtained by multiplying the depth-direction position by β/α. As a result, the Exif image file 510 is displayed at coordinates (Ax, Ay+β/2, α/2).

The Exif image file 511 is located at a position α/2 further deeper than the image file 510, and to improve visibility of the Exile image file located behind, the depth-direction position is shifted in the y-direction by β, which is a value obtained by multiplying the depth-direction position by β/α. As a result, the Exif image file 511 is displayed at coordinates (Ax, Ay+β, α).

The Exif image file 512 is laid out at a position of coordinates (Cx, Cy, 0) in the plane of the DCF directory 505 determined in step S4072.

The depth-direction position of the Exif image file 513 is α/4, and to improve visibility of the Exif image file located behind, that depth-direction position is shifted in the y-axis direction by β/4, which is a value obtained by multiplying the depth-direction position by β/α. As a result, the Exif image file 513 is displayed at coordinates (Ax, Ay+β/4, α/4).

Further, the depth-direction position of the Exif image file 514 is α/2, and to improve visibility of the Exile image file located behind, that depth-direction position is shifted in the y-axis direction by β/2, which is a value obtained by multiplying the depth-direction position by β/α. As a result, the Exif image file 514 is displayed at coordinates (Ax, Ay+β/2, α/2).

The depth-direction position of the Exif image file 515 is 3β/4, and to improve visibility of the Exile image file located behind, that depth-direction position is shifted in the y-axis direction by 3β/4, which is obtained by multiplying the depth-direction position by β/α. As a result, the Exif image file 515 is displayed at coordinates (Ax, Ay+3β/4, 3α/4).

Further, the depth-direction position of the Exif image file 516 is α, and to improve visibility of the Exif image file located behind, that depth-direction position is shifted in the y-axis direction by β, which is obtained by multiplying the depth-direction position by β/α. As a result, the Exif image file 516 is displayed at coordinates (Ax, Ay+β, α).

When laying out objects of each group in a virtual space according to the above-described processing, a display interval between the objects (images) can be determined for each group. Consequently, compared to laying out images at an equal interval in all groups, a user can recognize images of each group within a specified amount of parallax. As described above, according to the present invention, when recognizing images laid out by each group through a three-dimensional display device, a user comes to see the images laid out within a specified amount of parallax set for each group, thereby reducing the fatigue which the user feels.

The present invention concerns a display method of grouped display objects, and therefore, the display object may be other than the Exif image file. For example, a time line display, in which a list of frame images at each unit time of an image stream is displayed, may be taken as the display objects. In this case, each image stream is assigned as a group, and further, frame images at each unit time belonging to each image stream are assigned as the display objects, thereby achieving the same display of the images.

Further, as the display object, icon data, character information and the like are available. For example, when applying the present invention to a menu display, respective settings may be assigned by each type as a group, and the icons or characters indicating detailed choices included in each setting type may be assigned as the display objects, thereby achieving the same display.

Although, in the above-description, the present invention has been discussed above about a digital camera to take the Exif image file and the DCF standard as an example, the present invention can be carried out in other display devices which do not capture any image, such as a personal computer and television (TV).

The present invention has been described in detail regarding the respective exemplary embodiments above. However, the present invention is not restricted to those particular exemplary embodiments and a variety of other exemplary embodiments are included within the scope of the present invention as long as they do not depart from the spirit of the present invention. Further, parts of the above-described exemplary embodiments may be combined appropriately.

Other Embodiments

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-086515 filed Apr. 8, 2011, which is hereby incorporated by reference herein in its entirety.

What is claimed is:

1. A display control apparatus for displaying a plurality of images classified into a plurality of groups on a display device capable of performing three-dimensional representation by laying out the plurality of images at a predetermined interval in a depth direction of three-dimensional representation, the display control apparatus comprising:
   a determination unit configured to determine, for each group, a display interval between the plurality of images belonging to an identical group depending on a number of images included in the identical group;
   a layout unit configured to lay out the plurality of images in a depth direction based on the display interval of each group determined by the determination unit, and to lay out the plurality of groups so as to be displayed on a same screen; and
   a display control unit configured to display the images laid out by the layout unit on the display device.

2. The display control apparatus according to claim 1, wherein the interval of laying out the images of each group in the depth direction is constant.

3. The display control apparatus according to claim 1, wherein the display interval determined by the determination unit is constant within each group and different between the groups.

4. The display control apparatus according to claim 1, wherein the display control unit displays the images of an upper limit value three-dimensionally when the number of the images included in a group exceeds a predetermined upper limit value, while remaining images exceeding the upper limit value are displayed on the same coordinates in the depth direction as an image displayed at a deepest position.

5. The display control apparatus according to claim 1, wherein the display control unit displays the images of an upper limit value three-dimensionally when the number of images included in the group exceeds a predetermined upper limit value, while remaining images exceeding the upper limit value are not displayed.

6. A display control method for displaying a plurality of images classified into a plurality of groups on a display device capable of performing three-dimensional representation by laying out the plurality of images at a predetermined interval in a depth direction of three-dimensional representation, the display control method comprising steps of:
   determining, for each group, a display interval between the plurality of images belonging to an identical group depending on a number of images included in the identical group;
   laying out the plurality of images in the depth direction based on the display interval of each group determined by the determining step, and laying out the plurality of groups so as to be displayed on a same screen; and
   displaying the images laid out by the laying-out process on the display device.

7. The display control method according to claim 6, wherein the interval of laying out the images of each group in the depth direction is constant.

8. The display control method according to claim 6, wherein the display interval determined by the determining step is constant within each group and is different between the groups.

9. The display control method according to claim 6, wherein, images of an upper limit value are displayed three-dimensionally when the number of the images included in the group exceeds a predetermined upper limit value, while remaining images exceeding the upper limit value are displayed on the same coordinates in the depth direction as an image displayed at a deepest position.

10. The display control method according to claim 6, wherein the images of an upper limit value are displayed three-dimensionally when the number of images included in a group exceeds a predetermined upper limit value, while remaining images exceeding the upper limit value are not displayed.

* * * * *